US009860712B2

(12) United States Patent
Choi et al.

(10) Patent No.: US 9,860,712 B2
(45) Date of Patent: Jan. 2, 2018

(54) COMMUNICATING BROADCAST SIGNALS IN CARRIER-AGGREGATED WIRELESS NETWORKS

(71) Applicant: MARVELL WORLD TRADE LTD., St. Michael (BB)

(72) Inventors: Jihwan P. Choi, Daegu (KR); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 195 days.

(21) Appl. No.: 13/934,656

(22) Filed: Jul. 3, 2013

(65) Prior Publication Data

US 2014/0010139 A1    Jan. 9, 2014

Related U.S. Application Data

(60) Provisional application No. 61/668,599, filed on Jul. 6, 2012.

(51) Int. Cl.
*H04L 5/00*    (2006.01)
*H04W 4/06*    (2009.01)
(Continued)

(52) U.S. Cl.
CPC .............. *H04W 4/06* (2013.01); *H04L 5/001* (2013.01); *H04L 5/0053* (2013.01);
(Continued)

(58) Field of Classification Search
CPC .............................. H04L 5/001; H04L 5/0053
(Continued)

(56) References Cited

U.S. PATENT DOCUMENTS

2005/0207367 A1    9/2005   Onggosanusi et al.
2008/0182594 A1*    7/2008   Flore et al. .................. 455/458
(Continued)

FOREIGN PATENT DOCUMENTS

EP            1796415 A2    6/2007
EP    WO2013/113361 A1 *   8/2013
(Continued)

OTHER PUBLICATIONS

3GPP TS 23.203 V10.6.0, "3rd Generation Partnership Project; Technical Specification Group Services and System Aspects; Policy and Charging Control Architecture (Release 10)", Mar. 2012, 131 pages.
(Continued)

*Primary Examiner* — Fan Ng (57) ABSTRACT

A method is implemented in a communication device operating in a carrier aggregation mode utilizing a plurality of component carriers, where the plurality of component carriers includes at least (i) a primary component carrier associated with a primary cell and a primary cell broadcast message channel, and (ii) a secondary component carrier associated with a secondary cell and a secondary cell broadcast message channel. The method includes receiving, at the communication device, a broadcast message associated with the primary cell via (i) the primary cell broadcast message channel or (ii) the secondary cell broadcast message channel, decoding, at the communication device, the received broadcast message associated with the primary cell, receiving, at the communication device, a broadcast message associated with the secondary cell via the secondary cell broadcast message channel, and decoding, at the communication device, the received broadcast message associated with the secondary cell.

22 Claims, 5 Drawing Sheets

(51) Int. Cl.
*H04W 48/16* (2009.01)
*H04W 48/20* (2009.01)
*H04W 68/00* (2009.01)

(52) U.S. Cl.
CPC ............ *H04W 48/16* (2013.01); *H04W 48/20* (2013.01); *H04W 68/00* (2013.01)

(58) Field of Classification Search
USPC ........................................................ 370/312
See application file for complete search history.

(56) References Cited

U.S. PATENT DOCUMENTS

| | | | |
|---|---|---|---|
| 2008/0287068 A1 | 11/2008 | Etemad | |
| 2008/0299985 A1 | 12/2008 | Yang et al. | |
| 2011/0053596 A1* | 3/2011 | Wohlert | H04W 36/04 455/436 |
| 2011/0086662 A1* | 4/2011 | Fong et al. | 455/517 |
| 2011/0211571 A1* | 9/2011 | Ryu et al. | 370/350 |
| 2011/0280223 A1* | 11/2011 | Maeda et al. | 370/335 |
| 2012/0063373 A1* | 3/2012 | Chincholi | H04L 5/001 370/281 |
| 2013/0003668 A1* | 1/2013 | Xiao et al. | 370/329 |
| 2013/0295946 A1* | 11/2013 | Panchal | H04W 16/14 455/452.1 |
| 2014/0044088 A1* | 2/2014 | Nogami et al. | 370/329 |
| 2014/0112180 A1* | 4/2014 | Axmon | H04W 24/10 370/252 |
| 2014/0126508 A1* | 5/2014 | Young | H04W 4/005 370/329 |
| 2014/0293952 A1* | 10/2014 | Maniatis et al. | 370/329 |

FOREIGN PATENT DOCUMENTS

| | | | |
|---|---|---|---|
| FI | WO2013/041757 A1 * | 4/2013 | |
| WO | WO-2010-053334 A2 | 5/2010 | |
| WO | WO-2011-098593 A1 | 8/2011 | |
| WO | WO-2011/150747 A1 | 12/2011 | |

OTHER PUBLICATIONS

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.
3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.
U.S. Appl. No. 13/786,972, Jihwan P. Choi et al., filed Mar. 6, 2013.
Pedersen et al., "Carrier Aggregation for LTE-Advanced: Functionality and Performance Aspects," IEEE Communications Magazine, vol. 49, No. 6, pp. 89-95, Jun. 1, 2011.
3GPP TSG RAN WG2 #67bis, "Mapping of Logical Channels to Component Carriers", Miyazaki, Japan, Oct. 12-16, 2009, pp. 1-9.
3GPP TSG RAN WG2 #69bis, "Optimization of System Information Handling in Carrier Aggregation", Sony Corporation, Beijing, China, Apr. 12-16, 2010, 3 pages.
International Search Report and Written Opinion in PCT/US2013/049257 dated Dec. 20, 2013.
International Search Report and Written Opinion in PCT/US2013/029299 dated May 29, 2013.

* cited by examiner

COMMUNICATING BROADCAST SIGNALS IN CARRIER-AGGREGATED WIRELESS NETWORKS

CROSS-REFERENCE TO RELATED APPLICATION

This claims the benefit of U.S. Provisional Patent Application No. 61/668,599, entitled "Methods for Communicating Broadcast Signals in Carrier-Aggregated Wireless Networks" and filed on Jul. 6, 2012, the disclosure of which is hereby incorporated herein by reference.

FIELD OF TECHNOLOGY

The present disclosure relates generally to wireless networks and, more particularly, to wireless networks utilizing carrier aggregation.

BACKGROUND

As data throughput requirements increase, and the amount of available spectrum decreases, carrier aggregation has emerged as an attractive option for wireless service providers. With carrier aggregation, a wider bandwidth may be achieved by utilizing multiple (typically two) component carriers, where the frequency bands centered at the component carriers need not be contiguous. For example, carrier aggregation may be employed in order to utilize both an 800 MHz carrier and an 1800 MHz carrier for transmitting data streams to a single user terminal. Because each component carrier corresponds to a different cell, and the various cells may have different coverage areas, use of carrier aggregation may increase overall coverage area, in addition to increasing throughput.

The 3rd Generation Partnership Project (3GPP) Long Term Evolution Advanced (LTE-Advanced) standard is one example of a standard that supports carrier aggregation. The LTE-Advanced standard (also known as "Release 10") specifies a primary cell, or "Pcell," associated with a primary component carrier (PCC), and a secondary cell, or "Scell," associated with a different, secondary component carrier (SCC). In LTE-Advanced, system information for the Pcell is transmitted and decoded in the same way as defined under the earlier Releases 8 and 9, i.e., via a master information block (MIB) within the physical broadcast channel (PBCH), and via system information blocks (SIBs) within the physical downlink shared channel (PDSCH). Thus, the PCC is backwards-compatible with UEs configured according to Release 8 or 9. Conversely, the Scell does not transmit system information, and is not backwards-compatible with UEs configured according to Release 8 or 9. Instead, system information associated with the Scell is transmitted by the Pcell, via the PCC. Thus, in LTE-Advanced, UEs decode MIBs and SIBs transmitted on the PCC, but are not required to decode any MIB or SIB transmitted on the SCC. Similarly, paging messages are transmitted using the PCC, but not the SCC.

The base station (evolved NodeB, or eNB) of a Pcell may, in some scenarios, provide substantially worse channel conditions than the Scell, and/or the Scell may transmit signals that "shadow" the Pcell signals (a condition referred to as "power imbalance"). With respect to shadowing, for example, a UE may be much closer physically to the eNB of an Scell than to the eNB of a Pcell. As a result, in scenarios such as these, UE reception of system information and/or paging messages transmitted via the PCC may be degraded. Conventional systems tend to under-utilize the Scell by deactivating the Scell, causing the Scell to transmit power-limited signals, or causing the Scell to refrain from transmitting signals, in order to preserve Pcell signal quality. These approaches, however, tend to result in throughput loss for both the Scell eNB and the UE.

SUMMARY

In one embodiment, a method is implemented in a communication device operating in a carrier aggregation mode utilizing a plurality of component carriers, where the plurality of component carriers includes at least (i) a primary component carrier associated with a primary cell and a primary cell broadcast message channel, and (ii) a secondary component carrier associated with a secondary cell and a secondary cell broadcast message channel. The method includes receiving, at the communication device, a broadcast message associated with the primary cell via (i) the primary cell broadcast message channel or (ii) the secondary cell broadcast message channel. The method also includes decoding, at the communication device, the received broadcast message associated with the primary cell, receiving, at the communication device, a broadcast message associated with the secondary cell via the secondary cell broadcast message channel, and decoding, at the communication device, the received broadcast message associated with the secondary cell.

In another embodiment, a communication device operating in a carrier aggregation mode utilizing a plurality of component carriers, where the plurality of component carriers includes at least (i) a primary component carrier associated with a primary cell and a primary cell broadcast message channel, and (ii) a secondary component carrier associated with a secondary cell and a secondary cell broadcast message channel, includes a network interface. The network interface is configured to receive broadcast messages associated with the primary cell via (i) the primary cell broadcast message channel or (ii) the secondary cell broadcast message channel, decode the received broadcast messages associated with the primary cell, receive broadcast messages associated with the secondary cell via the secondary cell broadcast message channel, and decode the received broadcast messages associated with the secondary cell.

In another embodiment, a method is implemented in a communication device operating in a carrier aggregation mode utilizing a plurality of component carriers, where the plurality of aggregated component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels. The method includes receiving, at the communication device, a broadcast message associated with the primary cell via (i) the primary cell broadcast message channel or (ii) a first user-specific secondary cell channel of the one or more user-specific secondary cell channels. The first user-specific secondary cell channel is a channel dedicated to communications between the communication device and a base station of the secondary cell. The method also includes decoding, at the communication device, the received broadcast message associated with the primary cell, receiving, at the communication device, a broadcast message associated with the secondary cell via the first user-specific secondary cell channel, and decoding, at the communication device, the received broadcast message associated with the secondary cell.

In another embodiment, a communication device operating in a carrier aggregation mode utilizing a plurality of component carriers, where the plurality of component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels, includes a network interface. The network interface is configured to receive broadcast messages associated with the primary cell via (i) the primary cell broadcast message channel or (ii) a first user-specific secondary cell channel of the one or more user-specific secondary cell channels. The first user-specific secondary cell channel is a channel dedicated to communications between the communication device and a base station of the secondary cell. The network interface is also configured to decode the received broadcast messages associated with the primary cell, receive broadcast messages associated with the secondary cell via the first user-specific secondary cell channel, and decode the received broadcast messages associated with the secondary cell.

The above embodiments may provide one or more advantages. For example, data throughput of the network may be increased in some scenarios, such as when the secondary cell provides a communication device (e.g., a UE) with better channel conditions than the primary cell. Moreover, additional network scheduling flexibility may be available in embodiments where a particular broadcast message may be communicated to a communication device via either the primary component carrier or the secondary component carrier.

DETAILED DESCRIPTION

In embodiments described below, carrier aggregation is utilized in a wireless network to increase network and user terminal throughput, and/or to increase the coverage area, as compared to single cell service. As the term is used herein, a "cell" generally corresponds to a particular component carrier that is to be aggregated. For example, a first cell may correspond to an 800 MHz carrier, and a second, smaller cell may correspond to an 1800 MHz carrier. Typically, the cells associated with the aggregated component carriers have overlapping coverage areas, and a user terminal may therefore (in at least some locations and scenarios) be serviced by any one of the two or more cells.

In some embodiments, a first, "primary" cell provides certain services and/or information not provided by one or more other, "secondary" cells being aggregated, and/or performs certain operations not provided by the secondary cell(s). In one embodiment, for example, the primary cell is substantially the same as a primary cell (Pcell) specified by the LTE-Advanced standard, and the secondary cell(s) is/are substantially the same as secondary cells as (Scells) specified by the LTE-Advanced standard, except with respect to the transmission of some or all broadcast messages (e.g., system information messages and/or paging messages) as described in various embodiments below. In one embodiment, the primary cell is generally in charge of communicating control information to user devices, while the secondary cell is used mainly to enhance data throughput.

In some embodiments, and unlike conventional systems in which only the primary cell broadcasts system information and paging messages, both the component carrier of the primary cell and the component carrier of the secondary cell are utilized to transmit broadcast messages (e.g., system information and/or paging messages) to user devices. In one embodiment and/or scenario, for example, a dedicated broadcast channel (and/or a dedicated paging channel) of the primary cell is used to broadcast messages associated with the primary cell, while a dedicated broadcast channel (and/or a dedicated paging channel) of the secondary cell is used to broadcast messages associated with the secondary cell. In another example embodiment and/or scenario, a dedicated broadcast channel (and/or a dedicated paging channel) of the secondary cell is used both to broadcast messages associated with the primary cell and to broadcast messages associated with the secondary cell. In yet another example embodiment and/or scenario, user-specific channels of the secondary cell are used to communicate primary cell and/or secondary cell broadcast messages to user devices. Because this latter embodiment may not require user devices to decode information transmitted via any dedicated broadcast channels or paging channels of secondary cells, the technique can in some embodiments be utilized in an LTE-Advanced systems without implementing changes to the current LTE-Advanced standard (e.g., without requiring that UEs be able to decode MIBs or SIBs transmitted by the secondary cell). Conversely, in some of the embodiments where broadcast channels and/or paging channels of the secondary cell(s) are utilized to communicate broadcast messages, user devices may implement more complex designs in order to decode such messages. This additional complexity may be offset, however, by a reduction in overhead signaling as compared to embodiments in which broadcast messages such as system information or paging messages are repeated on each of multiple, user-specific channels.

Figure 1:
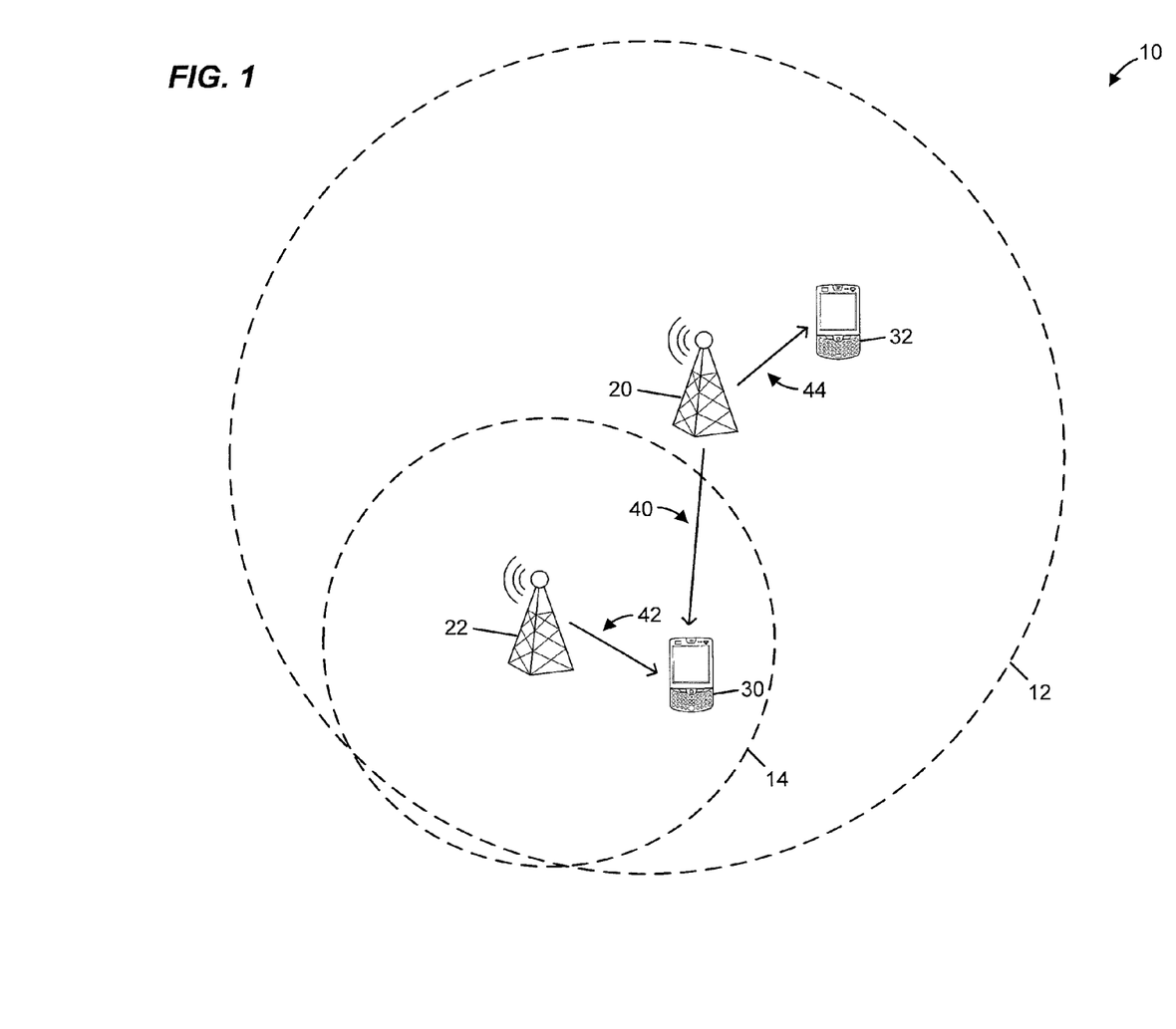
FIG. 1 is a diagram of an example cellular network in which carrier aggregation broadcast techniques are implemented, according to an embodiment.

FIG. 1 is a diagram of an example cellular network 10 in which carrier aggregation broadcast techniques are implemented, according to an embodiment. The cellular network 10 includes (i) a primary cell 12 corresponding to a primary component carrier, and (ii) a secondary cell 14 corresponding to a secondary component carrier. In one embodiment, for example, primary cell 12 corresponds to an 800 MHz carrier, and secondary cell 14 corresponds to an 1800 MHz carrier. In the example embodiment of FIG. 1, primary cell 12 is supported by a base station 20, and secondary cell 14 is supported by a base station 22. In other embodiments, however, both primary cell 12 and secondary cell 14 are supported by a single base station (e.g., a single base station having a separate antenna, transceiver, etc. for each cell/carrier, in an embodiment).

In one example embodiment, the cellular network 10 is a 3GPP LTE system, and each of the base stations 20 and 22 is an evolved node B ("eNodeB" or "eNB"). In another example embodiment, the cellular network 10 is a 3GPP wideband code division multiple access (WCDMA) system, and each of the base stations 20 and 22 is a "NodeB." In yet another example embodiment, the cellular network 10 is a WiMAX system. In some embodiments, the cellular network 10 includes one or more additional secondary cells, not shown in FIG. 1, that each correspond to a respective, additional component carrier, and overlap with primary cell 12 and/or secondary cell 14.

The cellular network 10 also includes user devices 30 and 32. In one embodiment where the cellular network 10 is a 3GPP LTE system, for example, each of the user devices 30, 32 is "user equipment," also referred to as a "UE." In the example embodiment of FIG. 1, the user device 30 is configured to utilize carrier aggregation by communicating via the component carriers of primary cell 12 and secondary cell 14, while the user device 32 is not so configured. In one embodiment where the cellular network 10 is an LTE-Advanced system, for example, the user device 30 is a UE configured to communicate via the primary component carrier of primary cell 12 aggregated with the secondary component carrier of secondary cell 14, and the user device 32 is a legacy UE configured to communicate via the primary component carrier of primary cell 12, but not via the secondary component carrier of secondary cell 14. In an alternative embodiment, the user device 32 is a legacy UE configured to communicate via the primary component carrier of primary cell 12, or via the secondary component carrier of secondary cell 14, but not both in an aggregated manner. While the example cellular network 10 of FIG. 1 includes a single user device 30 that is aggregation-compatible and a single user device 32 that is not aggregation-compatible, in various other scenarios the cellular network 10 includes additional user devices similar to user device 30, includes additional legacy user devices similar to user device 32, or does not include any legacy user devices.

Figure 2:
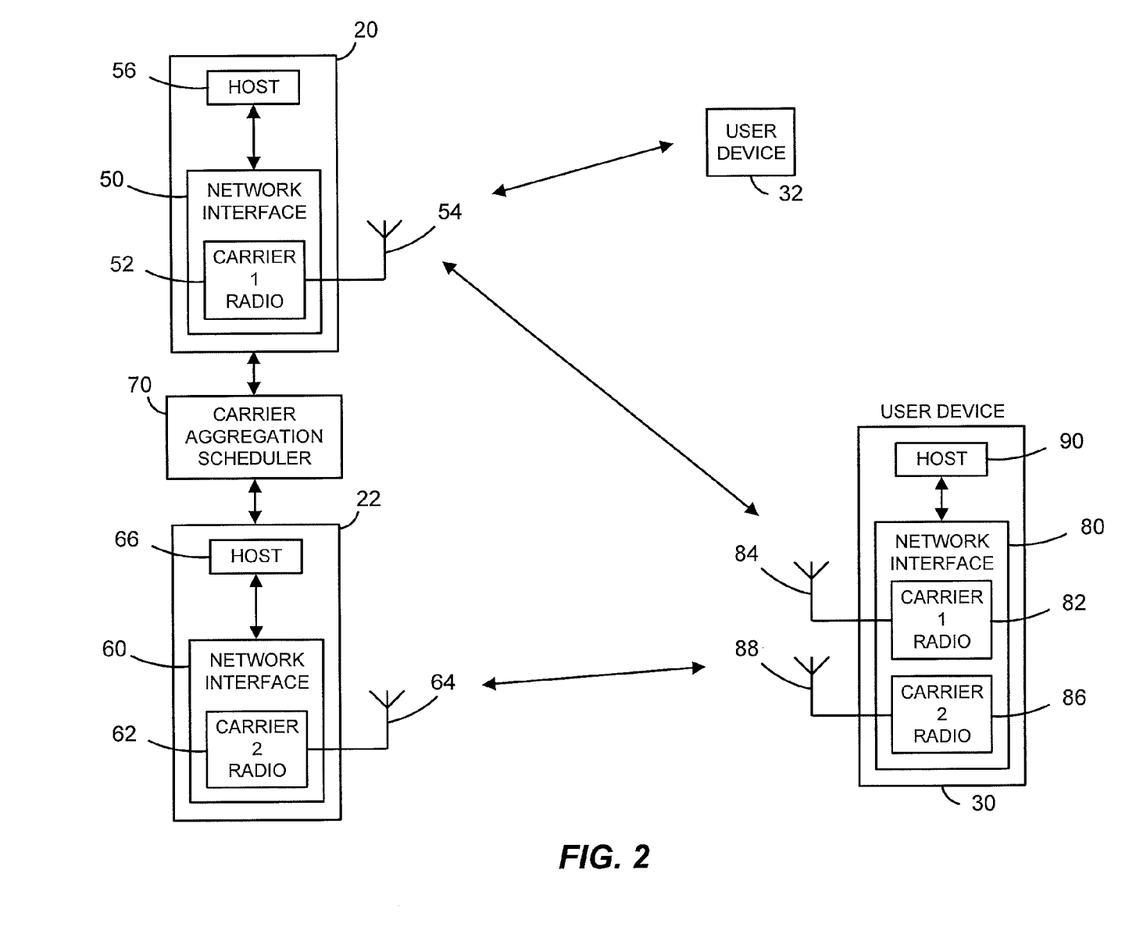
FIG. 2 is a more detailed block diagram of the example base stations and user devices in the cellular network of FIG. 1, according to an embodiment.

FIG. 2 is a more detailed block diagram of the base stations 20, 22 and user devices 30, 32 of the example cellular network 10 of FIG. 1, according to one embodiment. In the embodiment of FIG. 2, the primary cell base station 20 includes a network interface 50 with a radio 52 and antenna 54 for transmitting and receiving signals (e.g., physical layer (PHY) packets) via the primary component carrier of primary cell 12. In some embodiments, different antennas, and/or different transceivers within radio 52, are used to transmit and receive signals to and from user devices via the primary component carrier. Moreover, in some embodiments (e.g., in multiple input multiple output (MIMO) systems), the antenna 54 includes a set of two or more antennas and the radio 52 includes two or more corresponding transceivers. The network interface 50 is coupled to a host 56, which includes one or more processors and manages operations in base station 20, in an embodiment.

Similarly, the secondary cell base station 22 includes a network interface 60 with a radio 62 and antenna 64 for transmitting and receiving signals via the secondary component carrier of secondary cell 14. In some embodiments, different antennas, and/or different transceivers within radio 62, are used to transmit and receive signals to and from user devices via the secondary component carrier. Moreover, in some embodiments (e.g., in MIMO systems), the antenna 64 includes a set of two or more antennas and the radio 62 includes two or more corresponding transceivers. The network interface 60 is coupled to a host 66, which includes one or more processors and manages operations in the base station 22, in an embodiment.

Both the base station 20 of primary cell 12 and the base station 22 of secondary cell 14 are coupled to a carrier aggregation scheduler 70. The carrier aggregation scheduler 70 selects which component carrier will be used to communicate information to and/or from an aggregation-compatible user device, such as user device 30, in an embodiment. In alternative embodiments, the carrier aggregation scheduler 70 is included in base station 20, in base station 22, or is distributed among base station 20 and base station 22.

In the embodiment of FIG. 2, the aggregation-compatible user device 30 includes a network interface 80 with a first radio 82 and antenna 84 for transmitting and receiving signals via the primary component carrier of primary cell 12, and a second radio 86 and antenna 88 for transmitting and receiving signals via the secondary component carrier of secondary cell 14. In some embodiments, different antennas, and/or different transceivers of the radios, are used to transmit and receive signals on the respective component carriers. Moreover, in some embodiments (e.g., in MIMO systems), the antenna 84 and/or the antenna 88 include(s) a set of two or more antennas, and the radio 82 and/or the radio 86 include(s) two or more corresponding transceivers. In some embodiments, the radios 82 and 86 are independent at one or more of the PHY layer, the medium access control (MAC) layer, and the radio link control and packet data convergence protocol (RLC/PDCP) layer. In other embodiments, the radios 82 and 86 are integrated at all layers. The radios 82 and 86 are coupled to a host 90, which includes one or more processors and manages operations in the user device 30, in an embodiment. In some embodiments, for example, the host 90 causes the user device 30 to enter (and to operate according to) a carrier aggregation mode at the appropriate times. In other embodiments, the network interface 80 causes the user device 30 to enter (and to operate according to) a carrier aggregation mode independently of the host 90. In some embodiments, the configuration of user device 32 is similar to the configuration of user device 30. In an embodiment, however, the user device 32 does not include an additional radio and antenna for communicating via the secondary component carrier.

Figure 3A:
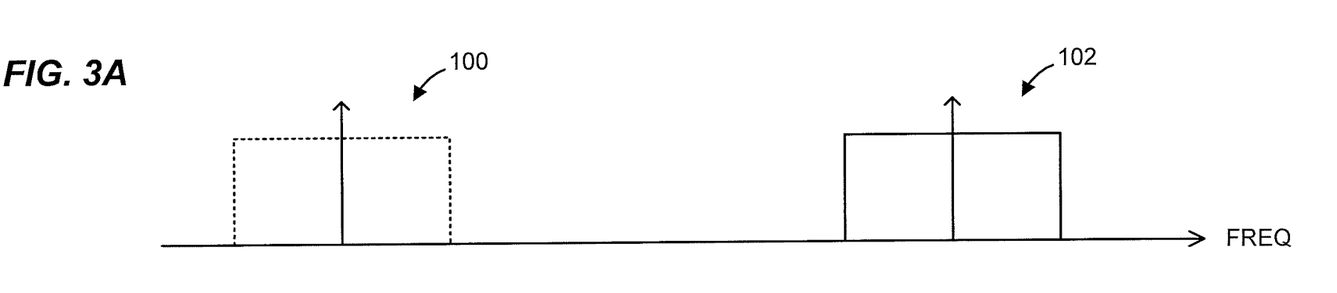
FIGS. 3A and 3B are diagrams of example component carriers via which carrier aggregation broadcast techniques are implemented, according to an embodiment.
Figure 3B:
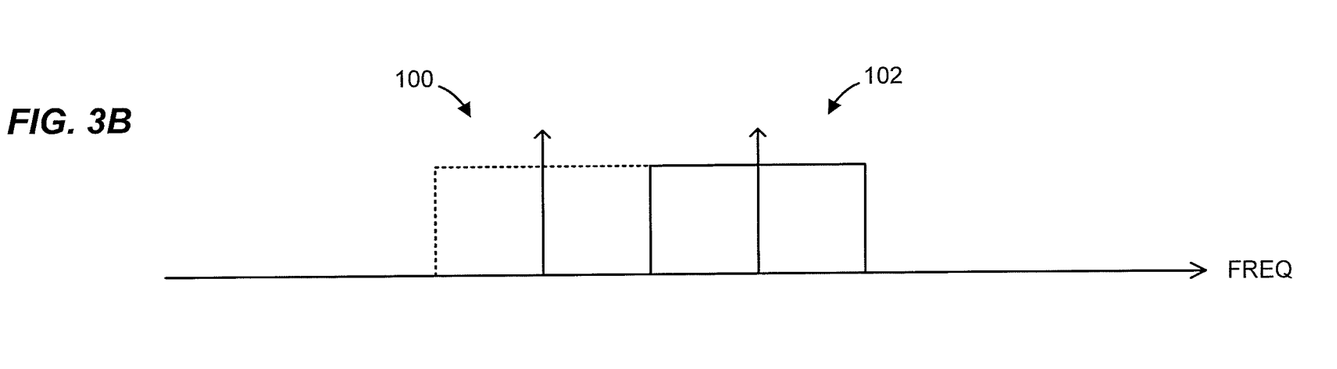

FIGS. 3A and 3B are diagrams showing an example primary component carrier 100 corresponding to primary cell 12 of FIG. 1 and an example secondary component carrier 102 corresponding to secondary cell 14 of FIG. 1, according to different embodiments in which two component carriers are aggregated. In the embodiment of FIG. 3A, the primary component carrier 100 is separated from the secondary component carrier 102 by a frequency gap. Conversely, in the embodiment of FIG. 3B, the primary component carrier 100 and secondary component carrier 102 are contiguous in frequency. While FIGS. 3A and 3B both show equal bandwidths for the primary component carrier 100 and secondary component carrier 102, in other embodiments and/or scenarios the bandwidths of the primary component carrier 100 and the secondary component carrier 102 are different. Moreover, in some embodiments, the primary component carrier 100 and the secondary component carrier 102 are each associated with a respective uplink frequency sub-band, downlink frequency sub-band, control channel sub-band, and/or other frequency sub-band.

Referring again to FIG. 1, the cellular network 10 provides various types of broadcast messages to user devices such as user device 30 or user device 32. In one embodiment, for example, cellular network 10 is designed to provide user devices with system information, e.g., for purposes of efficiently managing communications within cellular network 10. Additionally, or alternatively, in an embodiment, the cellular network 10 is designed to provide paging messages to user devices. In an embodiment where the cellular network 10 is an LTE system, for example, the cellular network 10 sends system information, including master information blocks (MIBs) and system information blocks (SIBs), as well as paging messages (e.g., to request the establishment of a signaling connection with a UE), to UEs such as user devices 30 and 32.

The various broadcast messages (e.g., system information and/or paging messages) provided by the cellular network 10 are each associated with a particular cell, in an embodiment. In one embodiment where cellular system 10 is an LTE system, for example, primary cell 12 is associated with MIBs and SIBs that convey various types of system information regarding primary cell 12 (e.g., mobile country code, DRX cycle length, cell identity, etc.), while secondary cell 14 is associated with MIBs and SIBs that convey the same or similar types of system information regarding secondary cell 14. Similarly, in one such embodiment, primary cell 12 is associated with paging messages corresponding to a tracking area that includes primary cell 12, while secondary cell 14 is associated with paging messages corresponding to a tracking area that includes secondary cell 14. As used herein, a paging message is said to be "associated" with a particular cell even if the cell is only one of multiple cells with which the paging message is associated (e.g., even if the cell is only one of multiple neighboring cells in a single tracking area, in an embodiment).

The broadcast messages (e.g., system information and/or paging messages) of each cell are provided to user devices in various different ways according to different embodiments. In one embodiment where the cellular network 10 supports legacy user devices (e.g., user device 32), for example, the base station 20 provides broadcast messages associated with primary cell 12 to the legacy user devices in primary cell 12, and the base station 22 provides broadcast messages associated with secondary cell 14 to the legacy user devices in secondary cell 14. In another embodiment, however, the base station 20 provides broadcast messages associated with primary cell 12 to legacy user devices in primary cell 12, but the base station 22 is unable to support legacy user devices.

The manner in which the broadcast messages of each cell are provided to user devices operating in a carrier aggregation mode also varies according to different embodiments. In one embodiment where a user device (e.g., user device 30) utilizes carrier aggregation to communicate on both the primary component carrier and the secondary component carrier, primary cell 12 provides broadcast messages associated with primary cell 12 via the primary component carrier, and secondary cell 14 provides broadcast messages associated with secondary cell 14 via the secondary component carrier. In one embodiment where cellular network 10 is an LTE system, for example, MIBs of primary cell 12 are transmitted to UEs via a broadcast channel (BCH) in a physical broadcast channel (PBCH) of primary cell 12, SIBs of primary cell 12 are transmitted to UEs via a BCH in a physical downlink shared channel (PDSCH) of primary cell 12, and paging messages of primary cell 12 are transmitted to UEs via a paging channel (PCH) in the PDSCH of primary cell 12. Similarly, in this embodiment, MIBs of secondary cell 14 are transmitted to UEs via a BCH in a PBCH of secondary cell 14, SIBs of secondary cell 14 are transmitted to UEs via a BCH in a PDSCH of secondary cell 14, and paging messages of secondary cell 14 are transmitted to UEs via a PCH in the PDSCH of secondary cell 14.

In another embodiment, primary cell 12 provides broadcast messages associated with primary cell 12 via the primary component carrier, and secondary cell 14 provides broadcast messages associated with secondary cell 14 by encapsulating the messages in user-specific channels of the secondary cell 14 (i.e., channels dedicated to communications with particular user devices). In one embodiment where cellular network 10 is an LTE system, for example, MIBs of primary cell 12 are transmitted to UEs via a BCH in a PBCH of primary cell 12, SIBs of primary cell 12 are transmitted to UEs via a BCH in a PDSCH of primary cell 12, and paging messages of primary cell 12 are transmitted to UEs via a PCH in the PDSCH of primary cell 12. Conversely, in this embodiment, MIBs, SIBs and paging messages of secondary cell 14 are transmitted to UEs via UE-specific channels of secondary cell 14. Of course, the use of user-specific (e.g., UE-specific) channels to "broadcast" a message may, in some scenarios and embodiments, require transmitting each message via a large number of independent channels.

In some embodiments and scenarios in which the cellular network 10 is actively implementing carrier aggregation, the secondary component carrier provides user devices not only with broadcast messages of secondary cell 14, but also with broadcast messages of primary cell 12. In one embodiment, for example, the secondary component carrier provides user devices with broadcast messages of both secondary cell 14 and primary cell 12 if it is determined that a majority of user devices have better channel conditions in the secondary cell 14 than in the primary cell 12, or based on some other suitable criteria. In one embodiment, the primary component carrier provides user devices with the broadcast messages of primary cell 12, and the secondary component carrier provides user devices with the broadcast messages of secondary cell 14, if it is determined that most user devices have similar channel conditions in both the primary cell 12 and the secondary cell 14.

Generally, the capability to send broadcast messages via secondary cell 14 (in addition to primary cell 12), using either broadcast/paging channels of secondary cell 14 or user-specific channels of secondary cell 14, provides additional scheduling flexibility between the component carriers (e.g., scheduling of which component carrier is used to convey a particular signal or data), and increases throughput by utilizing the better channel conditions of secondary cell 14 when such conditions are available.

Figure 4:
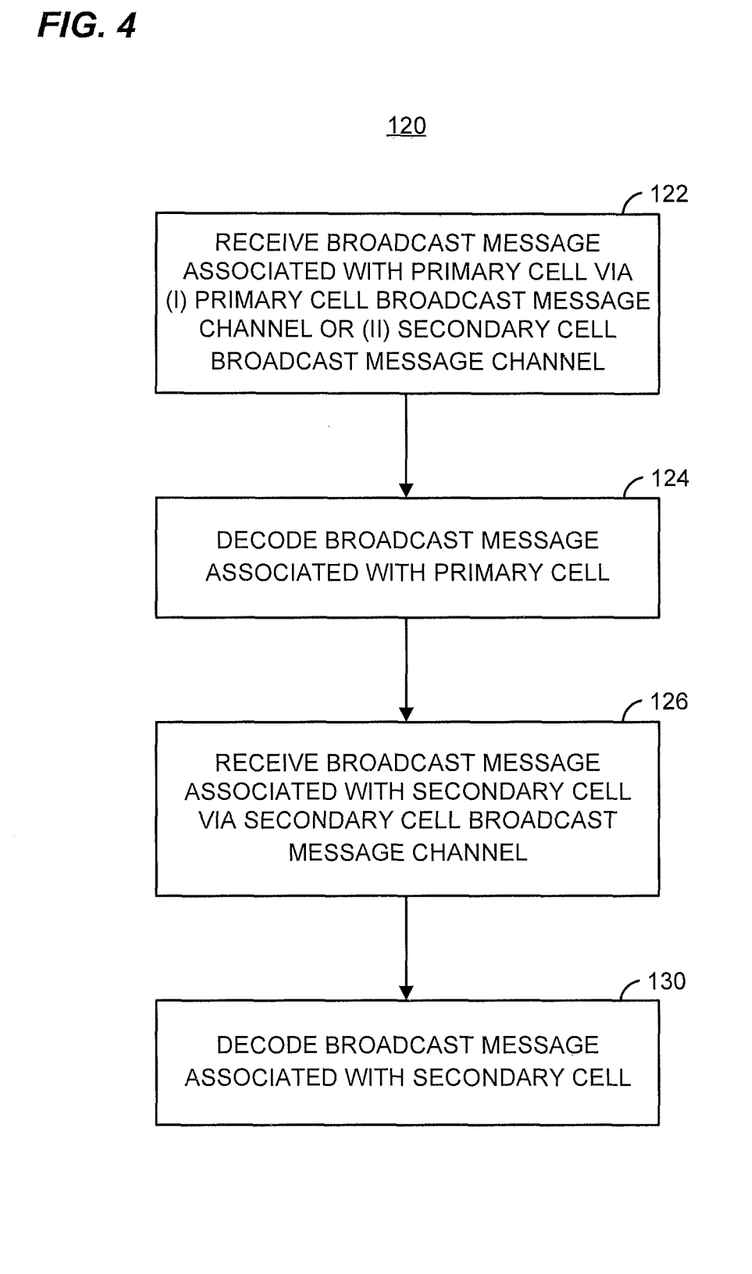
FIG. 4 is a flow diagram of an example method for receiving broadcast messages in a communication network utilizing carrier aggregation, according to an embodiment.

FIG. 4 is a flow diagram of an example method 120 for receiving broadcast messages in a communication network operating in a carrier aggregation mode utilizing a plurality of component carriers, according to an embodiment. In an embodiment, the method 120 is implemented by the user device 30 of FIGS. 1 and 2 (e.g., is implemented within network interface 80 of FIG. 2, when receiving broadcast messages from base stations 20 and 22 in the cellular network 10 of FIG. 1). In some embodiments, the method 120 is implemented by one or more processors executing machine-readable instructions stored in a tangible, computer-readable medium or media such as volatile or non-volatile memory.

At block 122, a broadcast message associated with a primary cell is received via either a primary cell broadcast message channel (i.e., a broadcast message channel associated with a primary cell, such as primary cell 12 of FIG. 1, for example) or a secondary cell broadcast message channel (i.e., a broadcast message channel associated with a secondary cell, such as secondary cell 14 of FIG. 1, for example). In various embodiments, the broadcast message associated with the primary cell can be received by the communication device implementing the method 120 only via the primary cell broadcast message channel, or only via the secondary cell broadcast message channel, but not both. In other embodiments, the broadcast message associated with the primary cell can be received via either the primary cell broadcast message channel or the secondary cell broadcast message channel, depending on various factors such as channel conditions in each cell.

In some embodiments and/or scenarios, the broadcast message associated with the primary cell includes system information, which may be used by the communication device implementing the method 120 for control/management purposes. In one embodiment where the method 120 is implemented by a communication device in an LTE system, for example, the system information includes an MIB and/or SIB. In other embodiments and/or scenarios, the broadcast message associated with the primary cell includes a paging message.

According to various embodiments and/or scenarios, the primary cell broadcast message channel or secondary cell broadcast message channel (i.e., whichever channel is used at block 122 to communicate the broadcast message) is a dedicated broadcast channel, or a dedicated paging channel, associated with the respective cell. In one embodiment and/or scenario, for example, in an LTE system where the broadcast message associated with the primary cell includes system information such as an MIB and/or SIB, the primary cell broadcast message channel or secondary cell broadcast message channel is a BCH within the PBCH or PDSCH of the respective cell. In particular, according to one such embodiment, the primary cell broadcast message channel or secondary cell broadcast message channel is a BCH within the PBCH of the respective cell if the broadcast message is an MIB, and is a BCH within the PDSCH of the respective cell if the broadcast message is an SIB. In another embodiment and/or scenario in an LTE system, where the broadcast message associated with the primary cell includes a paging message, the primary cell broadcast message channel is a PCH within the PDSCH of the respective cell.

At block 124, the broadcast message associated with the primary cell (received at block 122) is decoded. In an embodiment, the communication device implementing the method 120 then operates in accordance with the decoded information within the broadcast message (e.g., participates in the set-up of a signaling link with a base station of the primary cell as requested by a paging message, sets parameters for operating within the primary cell according to parameters indicated in an SIB, etc.).

At block 126, a broadcast message associated with the secondary cell is received. The broadcast message is received via the secondary cell broadcast message channel, which is described above in connection with block 122. In some embodiments and/or scenarios, the broadcast message associated with the secondary cell includes system information, which may be used by the communication device implementing the method 120 for control/management purposes. In one embodiment where the method 120 is implemented by a communication device in an LTE system, for example, the system information includes an MIB and/or SIB. In other embodiments and/or scenarios, the broadcast message associated with the secondary cell includes a paging message.

At block 130, the broadcast message associated with the secondary cell (received at block 126) is decoded. In an embodiment, the communication device implementing the method 120 then operates in accordance with the decoded information within the broadcast message (e.g., participates in the set-up of a signaling link with a base station of the secondary cell as requested by a paging message, sets parameters for operating within the secondary cell according to parameters indicated in an SIB, etc.).

While FIG. 4 only explicitly shows blocks of method 120 that pertain to aggregation of the component carriers of a primary cell and a secondary cell, in some embodiments additional component carriers are aggregated (e.g., a component carrier of a third cell, or component carriers of a third cell and a fourth cell, etc.). In one embodiment, for example, the method 120 further includes a block in which a broadcast message (e.g., system information or paging message) associated with a third cell (e.g., an additional secondary cell) is received via a broadcast message channel (e.g., BCH or PCH) associated with the third cell, and a block in which the broadcast message associated with the third cell is decoded.

Figure 5:
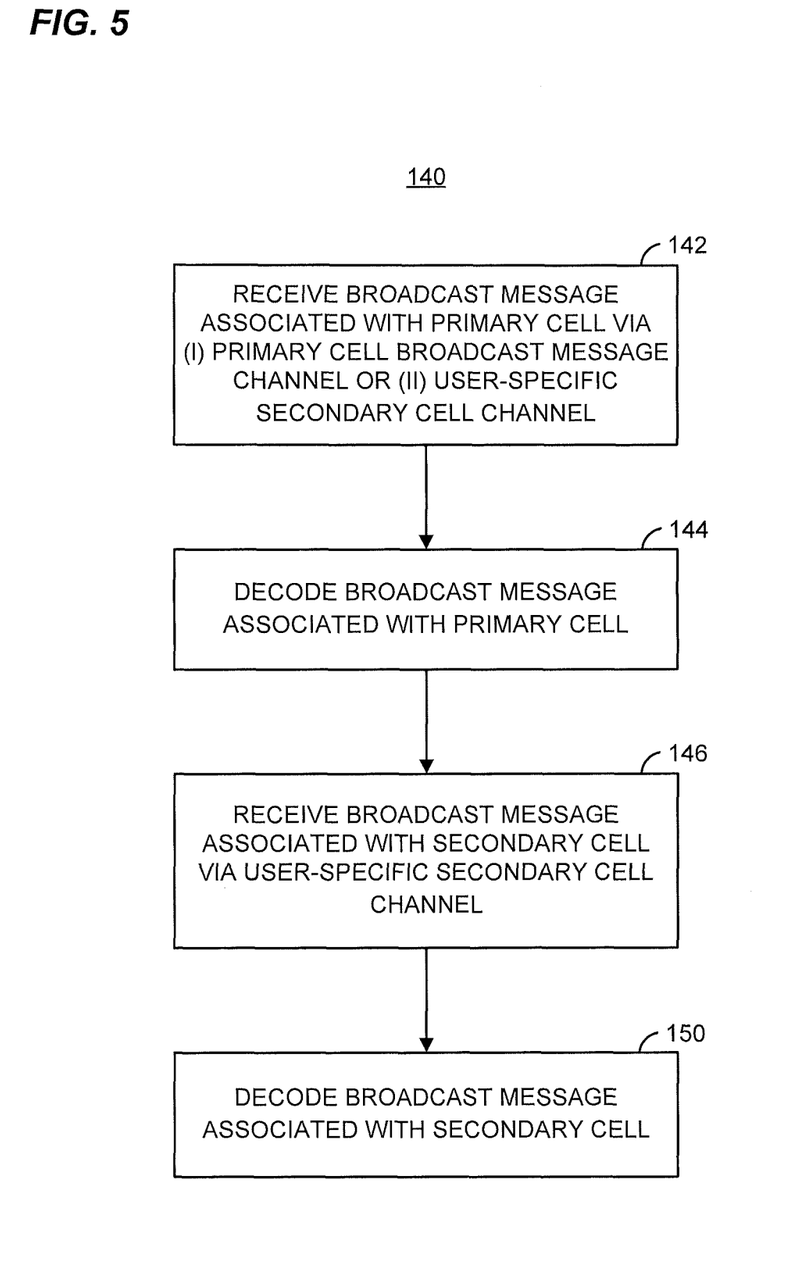
FIG. 5 is a flow diagram of another example method for receiving broadcast messages in a communication network utilizing carrier aggregation, according to an embodiment.

FIG. 5 is a flow diagram of another example method 140 for receiving broadcast messages in a communication device operating in a carrier aggregation mode utilizing a plurality of component carriers, according to an embodiment. In an embodiment, the method 140 is implemented by the user device 30 of FIGS. 1 and 2 (e.g., is implemented within network interface 80 of FIG. 2, when receiving broadcast messages from base stations 20 and 22 in the cellular network 10 of FIG. 1). In some embodiments, the method 140 is implemented by one or more processors executing machine-readable instructions stored in a tangible, computer-readable medium or media such as volatile or nonvolatile memory.

At block 142, a broadcast message associated with a primary cell is received via either a primary cell broadcast message channel (i.e., a broadcast message channel associated with a primary cell, such as primary cell 12 of FIG. 1, for example) or a user-specific secondary cell channel (i.e., one of a plurality of user-specific channels associated with a secondary cell, such as secondary cell 14 of FIG. 1, for example). In various embodiments, the broadcast message associated with the primary cell can be received by the communication device implementing the method 140 only via the primary cell broadcast message channel, or only via the user-specific secondary cell channel, but not both. In other embodiments, the broadcast message associated with the primary cell can be received via either the primary cell broadcast message channel or the user-specific secondary cell channel, depending on various factors such as channel conditions in each cell.

In some embodiments and/or scenarios, the broadcast message associated with the primary cell includes system information, which may be used by the communication device implementing the method 140 for control/management purposes. In one embodiment where the method 140 is implemented by a communication device in an LTE system, for example, the system information includes an MIB and/or SIB. In other embodiments and/or scenarios, the broadcast message associated with the primary cell includes a paging message.

According to various embodiments and/or scenarios, the primary cell broadcast message channel (if used at block 142 to communicate the broadcast message) is a dedicated broadcast channel, or a dedicated paging channel, associated with the primary cell. In one embodiment and/or scenario, for example, in an LTE system where the broadcast message associated with the primary cell includes system information such as an MIB and/or SIB, the primary cell broadcast message channel is a BCH within the PBCH or PDSCH of the primary cell. In particular, according to one such embodiment, the primary cell broadcast message channel is a BCH within the PBCH of the primary cell if the broadcast message includes an MIB, and is a BCH within the PDSCH of the primary cell if the broadcast message is an SIB. In another embodiment and/or scenario within an LTE system, where the broadcast message associated with the primary cell includes a paging message, the primary cell broadcast message channel is a PCH within the PDSCH of the primary cell.

In one embodiment and/or scenario where the broadcast message is instead received via a user-specific secondary cell channel, the user-specific secondary cell channel is a channel dedicated to communications with a specific user (e.g., with a specific UE). In one embodiment in an LTE system, for example, the user-specific secondary cell channel is a DL-SCH within the PDSCH of the secondary cell, and can also be used to transmit various types of traffic streams (e.g., non-control, non-paging data) to the UE.

At block 144, the broadcast message associated with the primary cell (received at block 142) is decoded. In an embodiment, the communication device implementing the method 140 then operates in accordance with the decoded information within the broadcast message (e.g., participates in the set-up of a signaling link with a base station of the primary cell as requested by a paging message, sets parameters for operating within the primary cell according to parameters indicated in an SIB, etc.).

At block 146, a broadcast message associated with the secondary cell is received. The broadcast message is received via the user-specific secondary cell channel described above in connection with block 142. In some embodiments and/or scenarios, the broadcast message associated with the secondary cell includes system information, which may be used by the communication device implementing the method 140 for control/management purposes. In one embodiment where the method 140 is implemented by a communication device in an LTE system, for example, the system information includes an MIB and/or SIB. In other embodiments and/or scenarios, the broadcast message associated with the secondary cell includes a paging message.

At block 150, the broadcast message associated with the secondary cell (received at block 146) is decoded. In an embodiment, the communication device implementing the method 140 then operates in accordance with the decoded information within the broadcast message (e.g., participates in the set-up of a signaling link with a base station of the secondary cell as requested by a paging message, sets parameters for operating within the secondary cell according to parameters indicated in an SIB, etc.).

While FIG. 5 only explicitly shows blocks of method 140 that pertain to aggregation of the component carriers of a primary cell and a secondary cell, in some embodiments additional component carriers are aggregated (e.g., a component carrier of a third cell, or component carriers of a third cell and a fourth cell, etc.). In one embodiment, for example, the method 140 further includes a block in which a broadcast message (e.g., system information or paging message) associated with a third cell (e.g., an additional secondary cell) is received via a user-specific channel (e.g., DL-SCH) associated with the third cell, and a block in which the broadcast message associated with the third cell is decoded.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc. Additionally, the present invention relates to one or more of the following clauses.

In one embodiment, a method is implemented in a communication device operating in a carrier aggregation mode utilizing a plurality of component carriers, where the plurality of component carriers includes at least (i) a primary component carrier associated with a primary cell and a primary cell broadcast message channel, and (ii) a secondary component carrier associated with a secondary cell and a secondary cell broadcast message channel. The method includes receiving, at the communication device, a broadcast message associated with the primary cell via (i) the primary cell broadcast message channel or (ii) the secondary cell broadcast message channel. The method also includes decoding, at the communication device, the received broadcast message associated with the primary cell, receiving, at the communication device, a broadcast message associated with the secondary cell via the secondary cell broadcast message channel, and decoding, at the communication device, the received broadcast message associated with the secondary cell.

In some embodiments, this method includes one or more of the following features.

Receiving a broadcast message associated with the primary cell includes receiving a broadcast message associated with the primary cell via the primary cell broadcast message channel.

Receiving a broadcast message associated with the primary cell includes receiving system information associated with the primary cell via a Long Term Evolution (LTE) broadcast channel (BCH) within (i) an LTE physical broadcast channel (PBCH) of the primary cell or (ii) an LTE physical downlink shared channel (PDSCH) of the primary cell, and receiving a broadcast message associated with the secondary cell includes receiving system information associated with the secondary cell via an LTE BCH within (i) an LTE PBCH of the secondary cell or (ii) an LTE PDSCH of the secondary cell.

Receiving system information associated with the primary cell includes (i) receiving a master information block (MIB) associated with the primary cell via the LTE PBCH of the primary cell, or (ii) receiving a system information block (SIB) associated with the primary cell via the LTE PDSCH of the primary cell, and receiving system information associated with the secondary cell includes (i) receiving an MIB associated with the secondary cell via the LTE PBCH of the secondary cell, or (ii) receiving an SIB associated with the secondary cell via the LTE PDSCH of the secondary cell.

Receiving a broadcast message associated with the primary cell includes receiving a paging message associated with a set of cells that includes the primary cell via a Long Term Evolution (LTE) paging channel (PCH) within an LTE physical downlink shared channel (PDSCH) of the primary cell, and receiving a broadcast message associated with the secondary cell includes receiving a paging message associated with a set of cells that includes the secondary cell via an LTE PCH within an LTE PDSCH of the secondary cell.

Receiving a broadcast message associated with the primary cell includes receiving a broadcast message associated with the primary cell via the secondary cell broadcast message channel.

Receiving a broadcast message associated with the primary cell includes receiving system information associated with the primary cell via a Long Term Evolution (LTE) broadcast channel (BCH) within (i) an LTE physical broadcast channel (PBCH) of the secondary cell or (ii) an LTE physical downlink shared channel (PDSCH) of the secondary cell, and receiving a broadcast message associated with the secondary cell includes receiving system information associated with the secondary cell via an LTE BCH within (i) the LTE PBCH of the secondary cell or (ii) the LTE PDSCH of the secondary cell.

Receiving system information associated with the primary cell includes (i) receiving a master information block (MIB) associated with the primary cell via the LTE PBCH of the primary cell, or (ii) receiving a system information block (SIB) associated with the primary cell via the LTE PDSCH of the primary cell, and receiving system information associated with the secondary cell includes (i) receiving an MIB associated with the secondary cell via the LTE PBCH of the secondary cell, or (ii) receiving an SIB associated with the secondary cell via the LTE PDSCH of the secondary cell.

Receiving a broadcast message associated with the primary cell includes receiving a paging message associated with a set of cells that includes the primary cell via a Long Term Evolution (LTE) paging channel (PCH) within an LTE physical downlink shared channel (PDSCH) of the secondary cell, and receiving a broadcast message associated with the secondary cell includes receiving a paging message associated with a set of cells that includes the secondary cell via the LTE PCH within the LTE PDSCH of the secondary cell.

In another embodiment, a communication device operating in a carrier aggregation mode utilizing a plurality of component carriers, where the plurality of component carriers includes at least (i) a primary component carrier associated with a primary cell and a primary cell broadcast message channel, and (ii) a secondary component carrier associated with a secondary cell and a secondary cell broadcast message channel, includes a network interface. The network interface is configured to receive broadcast messages associated with the primary cell via (i) the primary cell broadcast message channel or (ii) the secondary cell broadcast message channel, decode the received broadcast messages associated with the primary cell, receive broadcast messages associated with the secondary cell via the secondary cell broadcast message channel, and decode the received broadcast messages associated with the secondary cell.

In some embodiments, this communication device includes one or more of the following features.

The network interface is configured to receive broadcast messages associated with the primary cell at least by receiving the broadcast messages associated with the primary cell via the primary cell broadcast message channel.

The broadcast messages associated with the primary cell include system information associated with the primary cell, the primary cell broadcast message channel is a Long Term Evolution (LTE) broadcast channel (BCH) within (i) an LTE physical broadcast channel (PBCH) of the primary cell or (ii) an LTE physical downlink shared channel (PDSCH) of the primary cell, the broadcast messages associated with the secondary cell include system information associated with the secondary cell, and the secondary cell broadcast message channel is an LTE BCH within (i) an LTE PBCH of the secondary cell or (ii) an LTE PDSCH of the secondary cell.

The broadcast messages associated with the primary cell include paging messages associated with a set of cells that includes the primary cell, the primary cell broadcast message channel is a Long Term Evolution (LTE) paging channel (PCH) within an LTE physical downlink shared channel (PDSCH) of the primary cell, the broadcast messages associated with the secondary cell include paging messages associated with a set of cells that includes the secondary cell, and the secondary cell broadcast message channel is an LTE PCH within an LTE PDSCH of the secondary cell.

The network interface is configured to receive broadcast messages associated with the primary cell at least by receiving the broadcast messages associated with the primary cell via the secondary primary cell broadcast message channel.

The broadcast messages associated with the primary cell include system information associated with the primary cell, the secondary cell broadcast message channel is a Long Term Evolution (LTE) broadcast channel (BCH) within (i) an LTE physical broadcast channel (PBCH) of the secondary cell or (ii) an LTE physical downlink shared channel (PDSCH) of the secondary cell, and the broadcast messages associated with the secondary cell include system information associated with the secondary cell.

The broadcast messages associated with the primary cell include paging messages associated with a set of cells that includes the primary cell, the secondary primary cell broadcast message channel includes a Long Term Evolution (LTE) paging channel (PCH) within an LTE physical downlink shared channel (PDSCH) of the secondary cell, and the broadcast messages associated with the secondary cell include paging messages associated with a set of cells that includes the secondary cell.

In another embodiment, a method is implemented in a communication device operating in a carrier aggregation mode utilizing a plurality of component carriers, where the plurality of aggregated component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels. The method includes receiving, at the communication device, a broadcast message associated with the primary cell via (i) the primary cell broadcast message channel or (ii) a first user-specific secondary cell channel of the one or more user-specific secondary cell channels. The first user-specific secondary cell channel is a channel dedicated to communications between the communication device and a base station of the secondary cell. The method also includes decoding, at the communication device, the received broadcast message associated with the primary cell, receiving, at the communication device, a broadcast message associated with the secondary cell via the first user-specific secondary cell channel, and decoding, at the communication device, the received broadcast message associated with the secondary cell.

In some embodiments, this method includes one or more of the following features.

Receiving a broadcast message associated with the primary cell includes receiving system information associated with the primary cell via a Long Term Evolution (LTE) broadcast channel (BCH) within (i) an LTE physical broadcast channel (PBCH) of the primary cell or (ii) an LTE physical downlink shared channel (PDSCH) of the primary cell, or receiving a paging message associated with a set of cells that includes the primary cell via an LTE paging channel (PCH) within an LTE PDSCH of the primary cell, and receiving a broadcast message associated with the secondary cell includes receiving system information associated with the secondary cell via an LTE downlink shared channel (DL-SCH) in an LTE PDSCH of the secondary cell, or receiving a paging message associated with a set of cells that includes the secondary cell via the LTE DL-SCH in the LTE PDSCH of the secondary cell.

Receiving a broadcast message associated with the primary cell includes receiving system information associated with the primary cell via a Long Term Evolution (LTE) downlink shared channel (DL-SCH) in an LTE physical downlink shared channel (PDSCH) of the secondary cell, or receiving a paging message associated with a set of cells that includes the primary cell via the LTE DL-SCH in the LTE PDSCH of the secondary cell, and receiving a broadcast message associated with the secondary cell includes receiving system information associated with the secondary cell via the LTE DL-SCH in the LTE PDSCH of the secondary cell, or receiving a paging message associated with a set of cells that includes the secondary cell via the LTE DL-SCH in the LTE PDSCH of the secondary cell.

In another embodiment, a communication device operating in a carrier aggregation mode utilizing a plurality of component carriers, where the plurality of component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels, includes a network interface. The network interface is configured to receive broadcast messages associated with the primary cell via (i) the primary cell broadcast message channel or (ii) a first user-specific secondary cell channel of the one or more user-specific secondary cell channels. The first user-specific secondary cell channel is a channel dedicated to communications between the communication device and a base station of the secondary cell. The network interface is also configured to decode the received broadcast messages associated with the primary cell, receive broadcast messages associated with the secondary cell via the first user-specific secondary cell channel, and decode the received broadcast messages associated with the secondary cell.

In some embodiments, this communication device includes one or more of the following features.

The broadcast messages associated with the primary cell include (i) system information associated with the primary cell or (ii) paging messages associated with a set of cells that includes the primary cell, and the broadcast messages associated with the secondary cell include (i) system information associated with the secondary cell or (ii) paging messages associated with a set of cells that includes the secondary cell.

The primary cell broadcast message channel is a Long Term Evolution (LTE) broadcast channel (BCH) within (i) an LTE physical broadcast channel (PBCH) of the primary cell or (ii) an LTE physical downlink shared channel (PDSCH) of the primary cell, or an LTE paging channel (PCH) within an LTE PDSCH of the primary cell, and the first user-specific secondary cell channel is an LTE downlink shared channel (DL-SCH) in an LTE PDSCH of the secondary cell.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method, implemented in a communication device operating in a carrier aggregation mode utilizing a plurality of component carriers, wherein the plurality of component carriers includes at least (i) a primary component carrier associated with a primary cell and a primary cell broadcast message channel, and (ii) a secondary component carrier associated with a secondary cell and a secondary cell broadcast message channel, the method comprising:
  receiving, at the communication device, a broadcast message of the primary cell via the secondary cell broadcast message channel while the communication device i) operates in the carrier aggregation mode utilizing the primary component carrier associated with the primary cell and the secondary component carrier associated with the secondary cell and ii) receives signals directly from the primary cell via the primary component carrier;
  decoding, at the communication device, the received broadcast message of the primary cell;
  receiving, at the communication device, a broadcast message of the secondary cell via the secondary cell broadcast message channel while the communication device operates in the carrier aggregation mode utilizing the primary component carrier associated with the primary cell and the secondary component carrier associated with the secondary cell; and
  decoding, at the communication device, the received broadcast message of the secondary cell.

2. The method of claim 1, wherein:
receiving a broadcast message of the secondary cell includes receiving system information of the secondary cell via an LTE broadcast channel (BCH) within (i) an LTE physical broadcast channel (PBCH) of the secondary cell or (ii) an LTE physical downlink shared channel (PDSCH) of the secondary cell.

3. The method of claim 2, wherein:
receiving a broadcast message of the primary cell via the secondary cell broadcast message channel includes (i) receiving a master information block (MIB) of the primary cell, or (ii) receiving a system information block (SIB) of the primary cell; and
receiving system information of the secondary cell includes (i) receiving an MIB of the secondary cell via the LTE PBCH of the secondary cell, or (ii) receiving an SIB of the secondary cell via the LTE PDSCH of the secondary cell.

4. The method of claim 1, wherein:
receiving a broadcast message of the primary cell includes receiving a paging message of the primary cell; and
receiving a broadcast message of the secondary cell includes receiving a paging message of a set of cells that includes the secondary cell via an LTE paging channel (PCH) within an LTE physical downlink shared channel (PDSCH) of the secondary cell.

5. The method of claim 1, wherein:
receiving a broadcast message of the primary cell includes receiving system information of the primary cell via a Long Term Evolution (LTE) broadcast channel (BCH) within (i) an LTE physical broadcast channel (PBCH) of the secondary cell or (ii) an LTE physical downlink shared channel (PDSCH) of the secondary cell; and
receiving a broadcast message of the secondary cell includes receiving system information of the secondary cell via an LTE BCH within (i) the LTE PBCH of the secondary cell or (ii) the LTE PDSCH of the secondary cell.

6. The method of claim 5, wherein:
receiving system information of the primary cell includes (i) receiving a master information block (MIB) of the primary cell via the LTE PBCH of the secondary cell, or (ii) receiving a system information block (SIB) of the primary cell via the LTE PDSCH of the secondary cell; and
receiving system information of the secondary cell includes (i) receiving an MIB of the secondary cell via the LTE PBCH of the secondary cell, or (ii) receiving an SIB of the secondary cell via the LTE PDSCH of the secondary cell.

7. The method of claim 1, wherein:
receiving a broadcast message of the primary cell includes receiving a paging message of the primary cell via a Long Term Evolution (LTE) paging channel (PCH) within an LTE physical downlink shared channel (PDSCH) of the secondary cell; and
receiving a broadcast message of the secondary cell includes receiving a paging message of a set of cells that includes the secondary cell via the LTE PCH within the LTE PDSCH of the secondary cell.

8. The method of claim 1, further comprising:
the communication device receiving broadcast messages of the primary cell via the secondary cell broadcast message channel when channel conditions are better in the secondary cell than in the primary cell; and
the communication device receiving broadcast messages of the primary cell via the primary cell broadcast message channel when channel conditions are better in the primary cell than in the secondary cell.

9. A communication device operating in a carrier aggregation mode utilizing a plurality of component carriers, wherein the plurality of component carriers includes at least (i) a primary component carrier associated with a primary cell and a primary cell broadcast message channel, and (ii) a secondary component carrier associated with a secondary cell and a secondary cell broadcast message channel, the communication device comprising:
a network interface implemented on one or more integrated circuits, the network interface configured to
receive broadcast messages of the primary cell via the secondary cell broadcast message channel while the communication device i) operates in the carrier aggregation mode utilizing the primary component carrier associated with the primary cell and the secondary component carrier associated with the secondary cell and ii) receives signals directly from the primary cell via the primary component carrier;
decode the received broadcast messages of the primary cell,
receive broadcast messages of the secondary cell via the secondary cell broadcast message channel while the communication device operates in the carrier aggregation mode utilizing the primary component carrier associated with the primary cell and the secondary component carrier associated with the secondary cell, and
decode the received broadcast messages of the secondary cell.

10. The communication device of claim 9, wherein:
the broadcast messages of the primary cell include system information of the primary cell;
the primary cell broadcast message channel is a Long Term Evolution (LTE) broadcast channel (BCH) within (i) an LTE physical broadcast channel (PBCH) of the primary cell or (ii) an LTE physical downlink shared channel (PDSCH) of the primary cell;
the broadcast messages of the secondary cell include system information of the secondary cell; and
the secondary cell broadcast message channel is an LTE BCH within (i) an LTE PBCH of the secondary cell or (ii) an LTE PDSCH of the secondary cell.

11. The communication device of claim 9, wherein:
the broadcast messages of the primary cell include paging messages of the primary cell;
the primary cell broadcast message channel is a Long Term Evolution (LTE) paging channel (PCH) within an LTE physical downlink shared channel (PDSCH) of the primary cell;
the broadcast messages of the secondary cell include paging messages of a set of cells that includes the secondary cell; and
the secondary cell broadcast message channel is an LTE PCH within an LTE PDSCH of the secondary cell.

12. The communication device of claim 9, wherein:
the broadcast messages of the primary cell include system information of the primary cell;
the secondary cell broadcast message channel is a Long Term Evolution (LTE) broadcast channel (BCH) within (i) an LTE physical broadcast channel (PBCH) of the secondary cell or (ii) an LTE physical downlink shared channel (PDSCH) of the secondary cell; and
the broadcast messages of the secondary cell include system information of the secondary cell.

13. The communication device of claim 9, wherein:
the broadcast messages of the primary cell include paging messages of the primary cell;
the secondary cell broadcast message channel includes a Long Term Evolution (LTE) paging channel (PCH) within an LTE physical downlink shared channel (PDSCH) of the secondary cell; and
the broadcast messages of the secondary cell include paging messages of a set of cells that includes the secondary cell.

14. The communication device of claim 9, wherein the network interface is configured to:
receive broadcast messages of the primary cell via the secondary cell broadcast message channel when channel conditions are better in the secondary cell than in the primary cell; and
receive broadcast messages of the primary cell via the primary cell broadcast message channel when channel conditions are better in the primary cell than in the secondary cell.

15. A method, implemented in a communication device operating in a carrier aggregation mode utilizing a plurality of component carriers, wherein the plurality of aggregated component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels, the method comprising:
receiving, at the communication device, a broadcast message of the primary cell via a user-specific secondary cell channel of the one or more user-specific secondary cell channels while the communication device i) operates in the carrier aggregation mode utilizing the primary component carrier associated with the primary cell and the secondary component carrier associated with the secondary cell and ii) receives signals directly from the primary cell via the primary component carrier, wherein the user-specific secondary cell channel is a channel dedicated to communications between the communication device and a base station of the secondary cell;
decoding, at the communication device, the received broadcast message of the primary cell;
receiving, at the communication device, a broadcast message of the secondary cell via the user-specific secondary cell channel while the communication device operates in the carrier aggregation mode utilizing the primary component carrier associated with the primary cell and the secondary component carrier associated with the secondary cell; and
decoding, at the communication device, the received broadcast message of the secondary cell.

16. The method of claim 15, wherein:
receiving a broadcast message of the primary cell includes
receiving system information of the primary cell, or
receiving a paging message of the primary cell; and
receiving a broadcast message of the secondary cell includes
receiving system information of the secondary cell via an LTE downlink shared channel (DL-SCH) in an LTE PDSCH of the secondary cell, or
receiving a paging message of a set of cells that includes the secondary cell via the LTE DL-SCH in the LTE PDSCH of the secondary cell.

17. The method of claim 15, wherein:
receiving a broadcast message of the primary cell includes
receiving system information associated with the primary cell via a Long Term Evolution (LTE) downlink shared channel (DL-SCH) in an LTE physical downlink shared channel (PDSCH) of the secondary cell, or
receiving a paging message of the primary cell via the LTE DL-SCH in the LTE PDSCH of the secondary cell; and
receiving a broadcast message of the secondary cell includes
receiving system information of the secondary cell via the LTE DL-SCH in the LTE PDSCH of the secondary cell, or
receiving a paging message of a set of cells that includes the secondary cell via the LTE DL-SCH in the LTE PDSCH of the secondary cell.

18. The method of claim 15, further comprising:
the communication device receiving broadcast messages of the primary cell via the first user-specific secondary cell channel when channel conditions are better in the secondary cell than in the primary cell; and
the communication device receiving broadcast messages of the primary cell via the primary cell broadcast message channel when channel conditions are better in the primary cell than in the secondary cell.

19. A communication device operating in a carrier aggregation mode utilizing a plurality of component carriers, wherein the plurality of component carriers includes at least (i) a primary component carrier associated with a primary cell, a primary cell broadcast message channel, and one or more user-specific primary cell channels, and (ii) a secondary component carrier associated with a secondary cell and one or more user-specific secondary cell channels, the communication device comprising:
a network interface implemented on one or more integrated circuits, the network interface configured to
receive broadcast messages of the primary cell via a first user-specific secondary cell channel of the one or more user-specific secondary cell channels, while the communication device i) operates in the carrier aggregation mode utilizing the primary component carrier associated with the primary cell and the secondary component carrier associated with the secondary cell and ii) receives signals directly from the primary cell via the primary component carrier, wherein the user-specific secondary cell channel is a channel dedicated to communications between the communication device and a base station of the secondary cell,
decode the received broadcast messages of the primary cell,
receive broadcast messages of the secondary cell via the user-specific secondary cell channel while the communication device operates in the carrier aggregation mode utilizing the component carrier associated with the primary cell and the secondary component carrier associated with the secondary cell, and
decode the received broadcast messages of the secondary cell.

20. The communication device of claim 19, wherein:
the broadcast messages of the primary cell include (i) system information of the primary cell or (ii) paging messages of the primary cell; and the broadcast messages of the secondary cell include (i) system information of the secondary cell or (ii) paging messages associated with a set of cells that includes the secondary cell.

21. The communication device of claim 19, wherein:
the primary cell broadcast message channel is
- a Long Term Evolution (LTE) broadcast channel (BCH) within (i) an LTE physical broadcast channel (PBCH) of the primary cell or (ii) an LTE physical downlink shared channel (PDSCH) of the primary cell, or
- an LTE paging channel (PCH) within an LTE PDSCH of the primary cell; and the user-specific secondary cell channel is an LTE downlink shared channel (DL-SCH) in an LTE PDSCH of the secondary cell.

22. The communication device of claim 19, wherein the network interface is configured to:
- receive broadcast messages of the primary cell via the first user-specific secondary cell channel when channel conditions are better in the secondary cell than in the primary cell; and
- receive broadcast messages of the primary cell via the primary cell broadcast message channel when channel conditions are better in the primary cell than in the secondary cell.

* * * * *